US011935042B2

(12) United States Patent
Sforzin et al.

(10) Patent No.: US 11,935,042 B2
(45) Date of Patent: Mar. 19, 2024

(54) DELEGATED OFF-CHAIN PAYMENTS USING CRYPTOCURRENCIES

(71) Applicant: NEC Laboratories Europe GmbH, Heidelberg (DE)

(72) Inventors: Alessandro Sforzin, Heidelberg (DE); Maja Schwarz, Heidelberg (DE); Sebastien Andreina, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 186 days.

(21) Appl. No.: 17/503,389

(22) Filed: Oct. 18, 2021

(65) Prior Publication Data

US 2023/0052909 A1 Feb. 16, 2023

Related U.S. Application Data

(60) Provisional application No. 63/232,671, filed on Aug. 13, 2021.

(51) Int. Cl.
  *G06Q 20/38* (2012.01)
  *G06Q 20/06* (2012.01)
  *G06Q 20/40* (2012.01)

(52) U.S. Cl.
  CPC ..... *G06Q 20/3829* (2013.01); *G06Q 20/0658* (2013.01); *G06Q 20/38215* (2013.01); *G06Q 20/401* (2013.01)

(58) Field of Classification Search
  CPC ........... G06Q 20/3829; G06Q 20/0658; G06Q 20/38215; G06Q 20/401
  See application file for complete search history.

(56) References Cited

U.S. PATENT DOCUMENTS 10,163,079 B1   12/2018   Brock et al.
10,355,869 B2   7/2019   Bisti
(Continued)

FOREIGN PATENT DOCUMENTS

EP   3496332 B1   6/2021
KR   1020190132159 A   11/2019
(Continued)

OTHER PUBLICATIONS

Entriken, ERC-721: Non-Fungible Token Standard; Jan. 24, 2018 (Year: 2018).*
(Continued)

*Primary Examiner* — Steven S Kim
*Assistant Examiner* — Karlyannie Marie Garcia Mize
(74) *Attorney, Agent, or Firm* — Leydig, Voit & Mayer, Ltd.

(57) ABSTRACT

A method for securing an interblockchain transaction includes receiving, from a first user application, a registration request including a first permissioned blockchain public key and a first permissionless blockchain public key. The method also includes performing, by the processing circuitry, receiving, from a second user application, a second registration request including a second permissioned blockchain public key and a second permissionless blockchain public key. The permissioned blockchain public keys are valid on the permissioned blockchain and the permissionless blockchain public keys are valid on the permissionless public blockchain. In addition, the method includes receiving, from the first user application, a transaction identification, the transaction identification identifying a first transfer transaction executed on the permissionless public blockchain. The transaction identification identifies the first and second permissionless blockchain public keys.

8 Claims, 6 Drawing Sheets

(56) References Cited

U.S. PATENT DOCUMENTS

| | | | | |
|---|---|---|---|---|
| 2003/0195935 | A1* | 10/2003 | Leeper | H04L 63/0442 |
| | | | | 709/206 |
| 2003/0219121 | A1* | 11/2003 | van Someren | G07C 9/37 |
| | | | | 713/186 |
| 2015/0269591 | A1* | 9/2015 | Kontilai | G06Q 30/0185 |
| | | | | 705/4 |
| 2018/0268382 | A1 | 9/2018 | Wasserman | |
| 2019/0236565 | A1 | 8/2019 | Song et al. | |
| 2020/0074470 | A1 | 3/2020 | Deshpande et al. | |
| 2020/0242354 | A1 | 7/2020 | Ligman et al. | |
| 2020/0250661 | A1 | 8/2020 | Padmanabhan et al. | |
| 2021/0211414 | A1 | 7/2021 | Cage et al. | |
| 2022/0405742 | A1* | 12/2022 | Ravinathan | G06Q 20/02 |

FOREIGN PATENT DOCUMENTS

| | | | | |
|---|---|---|---|---|
| KR | 20210009051 | * | 1/2021 | G06Q 30/02 |
| WO | WO-2018194351 A1 | * | 10/2018 | G06F 21/10 |
| WO | WO-2019177380 A1 | * | 9/2019 | G06Q 20/3678 |
| WO | WO 2021052769 A1 | | 3/2021 | |

OTHER PUBLICATIONS

U.S. Appl. No. 17/503,388, filed Oct. 18, 2021, Pending.

Das, Poulami et al.; "FASTKITTEN: Practical Smart Contracts on Bitcoin"; *28th USENIX Security Symposium*; Aug. 14, 2019; pp. 1-18; XP055982178; retrieved from internet: https://www.usenix.org/system/files/sec19fa11_das_prepub.pdf; Santa Clara, CA, USA.

Dziembowski, Stefan et al.; "General State Channel Networks"; *Proceedings of The 2018 IEEE/ACM International Conference on Connected Health: Applications, Systems and Engineering Technologies, ACMPUB27*; Oct. 15, 2018; pp. 949-966; XP058701176; ISBN: 978-1-4503—6120-0; Association for Computing Machinery; New York, NY, USA.

Wuest, Karl et al.; "Bitcontracts: Supporting Smart Contracts in Legacy Blockchains"; *NDSS Symposium 2021*; Feb. 21, 2021; pp. 1-20; XP055982207; retrieved from internet: https://eprint.iacr.org/2019/857.pdf.

Zhang, Fan et al.; "The Ekiden Platform for Confidentiality—Preserving, Trustworthy, and Performant Smart Contracts"; *The IEEE European Symposium on Security and Privacy*; Mar. 23, 2020; pp. 17-27; vol. 18, No. 3; XP011788203; IEEE; Los Alamitos, CA, USA.

Li, W., A. Sforzin, S. Fedorov and G. O. Karame, "Towards scalable and private industrial blockchains," in Proceedings of the ACM Workshop on Blockchain, Cryptocurrencies and Contracts, Apr. 2017, pp. 9-14, ACM, US.

Androulaki, Elli et al. "Hyperledger fabric: a distributed operating system for permissioned blockchains," in Proceedings of the Thirteenth EuroSys Conference, Apr. 23-26, 2018, Portugal, ACM, US, pp. 1-15.

Androulaki, Elli et al. "Privacy-preserving auditable token payments in a permissioned blockchain system," pp. 1-19, Cryptology ePrint Archive, Online, Sep. 17, 2019.

Whitby, Ben, "How Security Tokens Can Lead Institutional Investors to Cryptocurrency," Apr. 20, 2020, Qredo, UK, pp. 1-6.

Shrestha, Ajay Kumar et al. "A Blockchain Platform for User Data Sharing Ensuring User Control and Incentives," Oct. 22, 2020, Frontiers in Blockchain, Article 497985, pp. 1-22, Frontiers Media, Switzerland.

Built In, "Blockchain Technology Defined," Built In, US, Oct. 15, 2021, pp. 1-17.

Yuan, Rui et al. "ShadowEth: Private Smart Contract on Public Blockchain," Journal of Computer Science and Technology 33(3), pp. 542-556, May 2018, Science Press of China, China, and Springer, Germany.

Mearian, Lucas, "Kadena launches a hybrid platform to connect public, private blockchains," Computerworld, US, Jan. 16, 2020, pp. 1-6.

Banerjee, Atitra et al. "zkHawk: Practical Private Smart Contracts from MPC-based Hawk," arXiv:2104.09180v3, May 3, 2021, pp. 1-9, Cornell University, US.

Taylor, Matt and Pierre Liddle, "Deploy smart contracts to your private Ethereum blockchain network on AWS," Feb. 7, 2019, pp. 1-14, AWS Database Blog, US.

Goes, Christopher, "The Interblockchain Communication Protocol: An Overview," arXiv:2006.15918v1, Jun. 29, 2020, pp. 1-26, Cornell University, US.

Brett, Charles, "Cosmos enables IBC (Inter-Blockchain Communication) token transfers," Apr. 7, 2021, enterprise times, Synonym Ltd, UK, pp. 1-5.

Gang Wang: "SoK: Exploring Blockchains Interoperability", ICAR International Association for Cryptologic Research, vol. Apr. 23, 2021:123406, Apr. 23, 2021 (Apr. 23, 2021), pp. 1-27, XP061059132.

Lucas Ballard et al: "Towards Practical Biometric Key Generation with Randomized Biometric Templates", Proceedings of The 15th ACM Conference on Computer and Communications Security, CCS '08, ACM Press, New York, New York, USA, Oct. 27, 2008 (Oct. 27, 2008), pp. 235-244, XP058344868.

\* cited by examiner

DELEGATED OFF-CHAIN PAYMENTS USING CRYPTOCURRENCIES

CROSS-REFERENCE TO RELATED APPLICATION

Priority is claimed to U.S. Provisional Patent Application No. 63/232,671, filed on Aug. 13, 2021, the entire disclosure of which is hereby incorporated by reference herein.

FIELD

The present invention relates to a method, system, and computer-readable medium for secure delegated off-chain payments using cryptocurrencies.

BACKGROUND

The trading of valuable items (e.g., works of art) is a complex process, usually carried out in auction houses or by specialized sellers, where buyers buy the item through an intermediary. The trading of such items—also known as collectables—has always required large amounts of liquidity, thus cutting off many prospective buyers.

A recent development is the introduction of fractional ownership to this market. Fractional ownership allows investors to only partially buy a collectable, that is, only a share of the collectable or a token representing a share of the collectable. In practice, this works like a stock exchange: a financial entity having custody of the collectable issues shares that investors can buy. The numbers of shares and their price is dictated by the laws of supply and demand. The process of digitizing a collectable in this manner is often referred to as tokenization.

Tokenization is a concept similar to that of cryptocurrency (e.g., Bitcoin), where a coin can be seen as a token. Furthermore, the trading of collectables is a complex process requiring intermediaries and trusted third parties—aspects addressed by blockchain technology. As a matter of fact, there are now trading platforms online that leverage the blockchain to allow buyers and sellers to trade collectables, or tokens that represent shares of a collectable, using cryptocurrencies. Not all of these trading platforms allow fractional ownership, and many of them use a single coin, i.e. Ethereum.

SUMMARY

In an embodiment, the present disclosure provides a method for securing an interblockchain transaction. The interblockchain transaction involves a first transfer on a permissioned blockchain and a second transfer on a permissionless public blockchain. The method includes performing, by the permissioned blockchain processing circuitry, receiving, from a first user application, a registration request including a first permissioned blockchain public key and a first permissionless blockchain public key, the first permissioned blockchain public key being valid on the permissioned blockchain and the first permissionless blockchain public key being valid on the permissionless public blockchain. The method also includes performing, by the processing circuitry, receiving, from a second user application, a second registration request including a second permissioned blockchain public key and a second permissionless blockchain public key, the second permissioned blockchain public key being valid on the permissioned blockchain and the second permissionless blockchain public key being valid on the permissionless public blockchain. In addition, the method includes receiving, from the first user application, a transaction identification, the transaction identification identifying a first transfer transaction executed on the permissionless public blockchain, the transaction identification identifying the first and second permissionless blockchain public keys. Furthermore, the method includes verifying, using the transaction identification, completion of the first transfer transaction, and in response to verifying the completion of the first transfer transaction, carrying out a second transfer transaction on the permissioned blockchain. The second transfer transaction involves a transfer from the second permissioned blockchain public key to the first permissioned blockchain public key.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
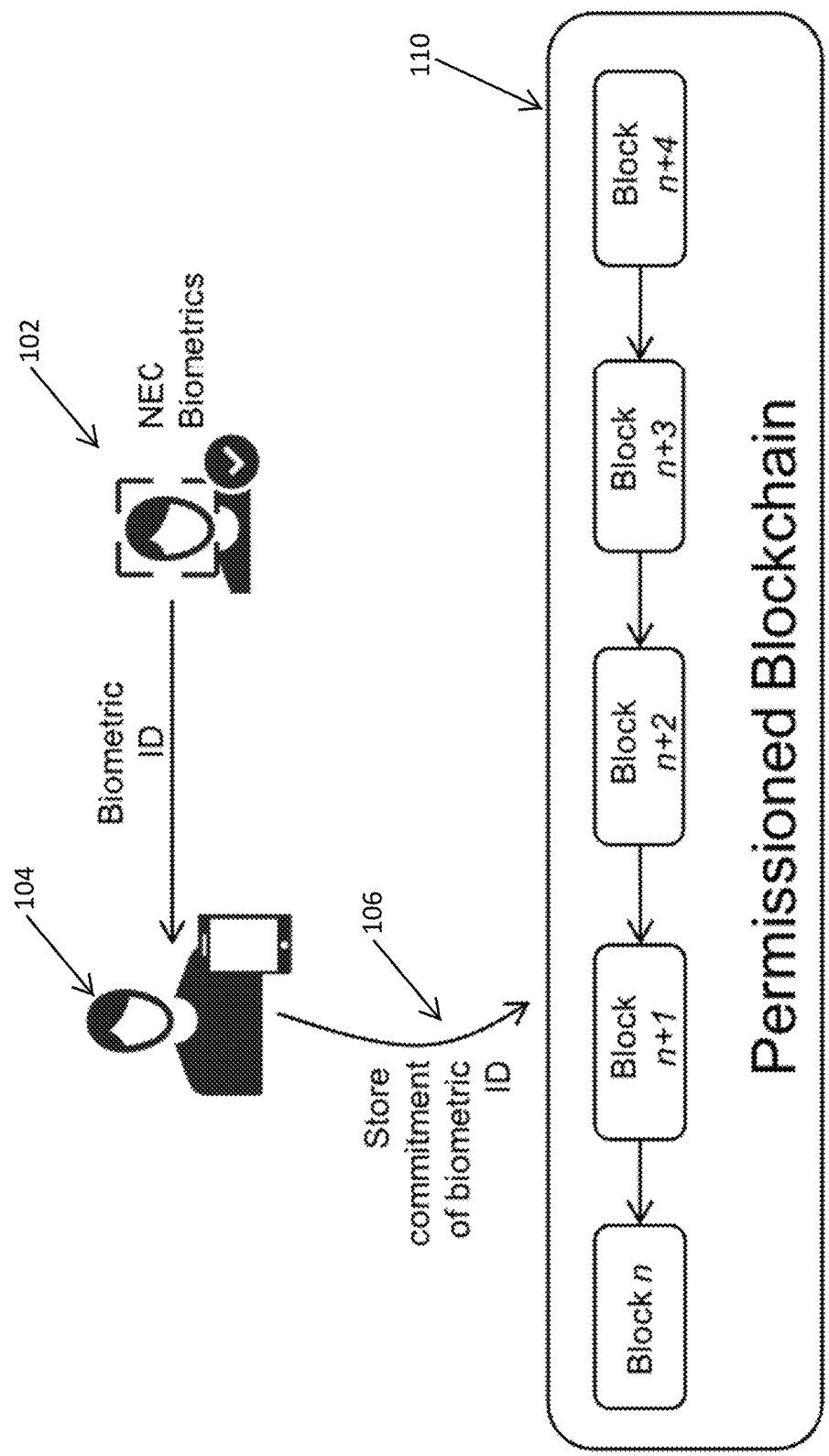
FIG. 1 illustrates a user registration process according to an embodiment of the present disclosure.

This present disclosure provides a mechanism to implement a permissioned blockchain-based marketplace that allows for fractional ownership of collectables and payments using digital currencies.

The present disclosure enables the use, in the permissioned, private blockchain-based marketplace, of widely accepted tokens (e.g. cryptocurrencies) from other blockchains, e.g. permissionless public blockchains, for payments or even other asset transactions—even where the permissioned private blockchain lacks a native currency. Accordingly, aspects of the present disclosure can be exploited in any blockchain use case that includes on-chain payments, and this is the case with the majority of use cases.

A drawback of the current state of the art is a reliance on public blockchains, such as Ethereum and Bitcoin, where participants can join and leave at any time and have access to all the data.

Aspects of the present disclosure leverage a permissioned blockchain, while still allowing use any digital currency for payments. The present disclosure employs a simple payment verification (SPV) client—also referred to as a light client—that allows investors to maintain a single wallet holding the cryptocurrency of their choice.

Other drawbacks of the current state of the art include a lack of full automation and reliance on untrustworthy third-party services (e.g., custody services). Reliance on third party services reduces the benefit of blockchain-based solutions.

In contrast, aspects of the present disclosure are fully automated and trustworthy. Specifically, aspects of the present disclosure provide a mechanism for the trade of collectables that is more efficient and secure than current technical solutions. According to aspects of the present disclosure, collectables are first converted into digital tokens, thus allowing for fractional ownership, and then traded in a digital marketplace. Aspects of the present disclosure utilize a permissioned blockchain for carrying out transactions involving the collectables and/or tokens representing shares thereof, because the digital marketplace should be accessible only by authenticated users, and data shared between the authenticated users should not be available to external parties.

Aspects of the present disclosure leverage the SPV client from within a smart contract on a public blockchain to verify transactions carried out on the public blockchain and delegate the payment on the public blockchain while ensuring security and atomicity for both the seller and the buyer on a private blockchain.

Aspects of the present disclosure can include an object-based fingerprint and a face detection engine to ensure a secure digitization of the object in question and the owner thereof.

A blockchain is a software that runs between multiple participants and provides a common view on a set of data. Aspects of the present disclosure leverage a permissioned blockchain, and therefore, a preliminary registration step is used to access the blockchain software. A successful registration grants a new user a valid identity that enables the user to join the network, engage in transactions, and query data stored on the blockchain.

A key feature of blockchains their immutable; i.e., data stored on the blockchain cannot be modified, making them effective against malicious tampering. However, data can still be read by all participants. Therefore, in the interest of users' privacy (e.g., their right to exercise the "right to be forgotten"), a preferred embodiment of the present disclosure does not store sensitive data (e.g., users' biometrics) on the blockchain, but rather only a commitment (e.g., as a hash).

The present disclosure may be implemented to leverage permissioned blockchain architecture, which is capable of providing high performance in both throughput (up to 100,000 transactions per second involving up to 200 different participants) and scalability. Such a permissioned blockchain can provide support for IoT (internet of things) devices, thereby providing full security for resource constrained devices that do not have the hardware required to maintain a full blockchain node. Such a permissioned blockchain can provide a higher degree of privacy due to a technology called satellite chains. Satellite chains are small, independent sub-chains with their own ledgers, smart contracts, consensus algorithms, and participants. Such satellite chains can communicate and transfer assets with each other if needed, while still maintaining their independence. Concretely, a satellite chain runs its own blockchain and thus provides the same performance as the main chain. Such a permissioned blockchain can be fully compatible with the open-source software Hyperledger fabric, and can provide the same smart contract capabilities.

Smart contracts are pieces of software that run on the blockchain and provide an interface via which to interact with the data. In other words, a smart contract is a computer program or transaction protocol that is configured to automatically execute and operate on the blockchain. Specifically, a smart contract is a processor-executable program (code) stored on a non-transitory processor readable medium that, when executed by processing circuitry, causes the processing circuitry to carry out program functions. The code is available (i.e. can be inspected) to all the members present on the network. A person of ordinary skill in the art would recognize that a "smart contract" is a technical aspect of blockchain networks used for, e.g., automation, and not a legal instrument or other means of constraining human activity.

Smart contracts are typically enforced by the nodes of the system. It is not possible for a single entity to bypass the rules defined by a smart contract, since it would require the agreement of the majority of the participants.

A main advantage of smart contracts is that they can automate an organization's business logic. Accordingly, a switch to automation can eliminate the consequences of human errors and misunderstandings that may lead to disputes. A legal contract or a law might be subject to personal interpretations, but software is deterministic; there is no room for subjective interpretation. Smart contracts can typically be issued by any entity in the system. According to aspects of the present disclosure, only a subset of entities is empowered to issue smart contracts in the system.

A simplified payment verification client, i.e. an SPV client, is a lightweight software program able to verify, to a certain degree of security, that a payment has been made on a public blockchain based on proof-of-work (PoW) (such public blockchains include the Bitcoin and Ethereum blockchains). The SPV client achieves this result without having to download the full history of the blockchain and is therefore suitable for resource constrained devices (e.g. mobile phones).

The SPV client typically verifies that a payment has been made on the public chain by requesting that multiple nodes of the public chain retrieve information about a transaction having a particular transaction identification (TxID). The nodes then reply with a series of block headers (that are very small) and a proof to show that the transaction with the TxID is included in one of those headers. This can be done by revealing the part of the Merkle tree whose root is stored in the header that contains the transaction. The SPV client requests multiple headers to make sure that the transaction is in a block that is indeed part of the public chain, and not in a block that has been maliciously crafted/removed from the public chain due to a fork.

The method implemented by the SPV client for verification of a transaction is secure as long as the adversary cannot break the Merkle tree security (which relies on hash function hardness) and is not able to produce sufficiently many block headers rapidly. Those assumptions are fair because they are consistent with the assumptions upon which PoW blockchains are based. Specifically, if an adversary could break the hash function used, then the whole PoW blockchain ecosystem would be broken, and if the adversary could generate sufficiently many block headers, then the adversary would possess more mining power than the majority, which goes against the assumptions of PoW blockchains.

According to aspects of the present disclosure, a system includes a user software application. The user software application, which is deployable, e.g., in mobile devices, allows a user to register with the system, browse the marketplace and the collectables, buy and sell collectables (or tokens thereof), and see an overview of possessions owned by said user. Upon installation of the user software application, the application generates a unique key pair (sk, pk) that, from that point forward, identifies the user in the system.

According to aspects of the disclosure, a format of all blockchain transactions capable of being executed in the system can be provided. According to a use case provided for by aspects of the present disclosure, a financial institution can take custody of a collectable in order to tokenize it and then publish the tokens to enable users to trade the tokens. In such a use case—as well as in other use cases, the specific blockchain transactions can include, for example:

User Registration Transaction:

$|Pubkey_{user}|biometrics\ commit|sig_{user}|$ where Pubkey is the public key generated by a user application, biometrics commit is the hash of the user's biometric data (used for later authentication), and sig is the user's digital signature that guarantees the authenticity and integrity of the previous fields. The user registration transaction can be executed by the user application.

Collectable Registration Transaction:

$|ID_{bank}|collectable\ fingerprint|sig_{bank}|$ where $ID_{bank}$ is a unique ID of the financial institution in charge of the collectable, collectible fingerprint is a unique fingerprint of the collectable, and $sig_{bank}$ is a digital signature of the financial institution that guarantees the authenticity and integrity of the previous fields. The financial institution issues a Collectable registration transaction after receiving the collectable's unique fingerprint using NEC object fingerprint software.

Collectable Validation Transaction:

$|ID_{collectable}|ID_{appraiser}|auth\ certificate|sig_{appraiser}|$ where $ID_{collectible}$ is a unique ID of a collectable to be validated, $ID_{appraiser}$ is the unique ID of an appraiser carrying out the validation of the collectable, auth certificate is a document, created by the appraiser, certifying that the collectable is authentic (i.e., not a counterfeited item), and $sig_{appraiser}$ is the appraiser's digital signature, which guarantees the authenticity and integrity of the previous fields. An appraiser creates the Collectable validation transaction during a Collectable validation step and broadcasts it to nodes of the permissioned blockchain.

Collectable Tokenization Transaction:

$|ID_{collectable}|ID_{owner}|Nr.\ tokens\|\ sig_{bank}|$ where $ID_{collectable}$ is the unique ID of the collectable to be tokenized, $ID_{owner}$ is a unique ID of the owner of the collectable, Nr.tokens is the number of tokens to be circulated for the collectable, and $sig_{bank}$ is the financial institution's digital signature that guarantees the authenticity and integrity of the previous fields. The financial institution creates this Collectable tokenization transaction during the Collectable tokenization step and broadcasts it.

Register Auction Transaction:

$|ID_{collectable}|ID_{seller}|Owner\ certificate_{seller}|sig_{seller}|$ where $ID_{collectable}$ is the unique ID of the collectable whose tokens are being traded, $ID_{seller}$ is the unique ID of the user currently owning the tokens up for sale, Owner certificate$_{seller}$ is a document in possession of the seller that certifies rightful ownership of the tokens to be traded, and $sig_{seller}$ is the digital signatures of seller.

Register Coins Transaction:

$|Pubkey_{buyer\_coins}|ID_{buyer}|sig_{pubkey_{buyer\_coins}}|sig_{buyer}|$ where $Pubkey_{buyer\_coins}$ is a public key corresponding to an account holding the buyer's coins on a public cryptocurrency blockchain, $ID_{buyer}$ is the ID of the user on the private blockchain, $sig_{pubkey_{buyer\_coins}}$ is the digital signature corresponding to the key holding the coins on a public cryptocurrency blockchain, and $sig_{buyer}$ is the digital signature of the buyer.

Register Bid Transaction:

$|ID_{collectable}|Nr.Coins|sig_{buyer}|$ where $ID_{collectable}$ is the ID of the collectable the buyer wants to acquire, NR.Coins is the number of coins the buyer has bidden for the collectable, and $sig_{buyer}$ is the signature of the potential buyer. The private blockchain's smart contract will "lock" the tokens until the trade is complete.

Direct Trade Token(s) Transaction:

$|ID_{collectable}|ID_{buyer}|ID_{seller}|Owner\ certificate_{seller}|Nr.\ Coins|sig_{buyer}|sig_{seller}|$ where $ID_{collectable}$ is the unique ID of the collectable whose tokens are being traded, $ID_{buyer}$ is the unique ID of the user wanting to buy the collectable's tokens, $ID_{seller}$ is the unique ID of the user currently owning the collectable's tokens to be sold to the buyer, Owner certificate$_{seller}$ is a document in possession of the buyer that certifies she is the rightful owner of the tokens being traded, Nr. Coins is the number of coins to be transferred from the seller to the buyer, and $sig_{buyer}$ and $sig_{seller}$ are the digital signatures of buyer and seller respectively, and they are both needed for the transaction to be successful. The private blockchain's smart contract will "lock" the tokens until the trade is complete.

An embodiment of the present disclosure includes a method including at least one of the following operations:

A) Registering new collectables, which includes one or more of:
1) Receiving, by the private blockchain, a register collectable transaction containing the fingerprint of the collectable and the ID of the bank responsible for handling it.
2) Receiving, by the private blockchain, a collectable validation transaction to prove the validity of the collectable. The collectable validation transaction contains an ID of the collectable, an ID of the appraiser, and a certificate of validity.
3) Receiving, by the private blockchain, a tokenization request that creates new tokens for the given collectable. The transaction contains the ID of the collectable and the ID of the owner, as well as a number of tokens (shares) to create for this asset (i.e. the collectable).

B) Exchanging tokens, which includes one or more of:
1) Receiving, by the private blockchain, either:
   a. A direct trade transaction, containing the ID of the seller, buyer, the number of tokens, the price, and the recipient key, or
   b. A start auction transaction, containing the ID of the seller, the number of tokens to sell and the recipient key. The start auction transaction further includes receiving, by the private blockchain, bidding transactions and verifying, by the simplified payment verification (SPV) client, that each respective bid does not exceed the amount of coins held by a user making the respective bid, tallying the bids, and notifying the winner.
2) Receiving, by the public blockchain, a normal send transaction to send coins from one address to another.

3) Receiving, by the private blockchain, the transaction ID from the buyer of the coin exchange and using the SPV client in the smart contract to verify the validity of the exchange.

4) Upon successful verification, finalizing, by a private smart contract, the auction/exchange and changing the owner of the tokens.

The method may include adding, to the blockchain system, a face template using a face detector in order to precisely identify an owner.

The method may further include utilizing an Object Fingerprint to ensure a 1-1 mapping between a digital object and a physical object (e.g. the collectable—in instances where the collectable is a physical object).

An embodiment of the present disclosure provides a method for securing an interblockchain transaction. The interblockchain transaction involves a first transfer on a permissioned blockchain and a second transfer on a permissionless public blockchain. The method can initially include instantiating, on the permissioned blockchain, processor-executable program code that, when executed by permissioned blockchain processing circuitry, causes the permissioned blockchain processing circuitry to carry out program functions on the permissioned blockchain. The permissioned blockchain processing circuitry then performs the following steps:

receiving, from a first user application, a registration request including a first permissioned blockchain public key and a first permissionless blockchain public key, the first permissioned blockchain public key being valid on the permissioned blockchain and the first permissionless blockchain public key being valid on the permissionless public blockchain;

receiving, from a second user application, a second registration request including a second permissioned blockchain public key and a second permissionless blockchain public key, the second permissioned blockchain public key being valid on the permissioned blockchain and the second permissionless blockchain public key being valid on the permissionless public blockchain;

receiving, from the first user application, a transaction identification, the transaction identification identifying a first transfer transaction executed on the permissionless public blockchain, the transaction identification identifying the first and second permissionless blockchain public keys;

verifying, using the transaction identification, completion of the first transfer transaction; and in response to verifying the completion of the first transfer transaction, carrying out a second transfer transaction on the permissioned blockchain, the second transfer transaction involving a transfer from the second permissioned blockchain public key to the first permissioned blockchain public key.

The method can also include, in response to the receiving the registration request from the first user application, verifying a cryptocurrency balance held by the first permissionless blockchain public key on the permissionless public blockchain. The verifying the cryptocurrency balance held by the first permissionless blockchain public key on the permissionless public blockchain can include invoking a simplified payment verification (SPV) client provided by the public blockchain to verify the cryptocurrency balance held by the first permissionless blockchain public key on the permissionless public blockchain. The verifying the completion of the first transfer transaction can include invoking the SPV client to retrieve information corresponding to the transaction identification.

The first transfer transaction can be a transfer, from the first permissionless blockchain public key to the second permissionless blockchain public key, of a native cryptocurrency of the permissionless blockchain. The second transfer transaction can be a transfer, from the second permissioned blockchain public key to the first permissioned blockchain public key, of a token representing a share of a collectable.

The method can also include registering the collectable with the permissioned blockchain. Registering the collectable with the permissioned blockchain can include generating a unique ID that uniquely identifies the collectable on the permissioned blockchain, pairing a unique object fingerprint to the unique ID, and storing the unique ID and the unique object fingerprint to the permissioned blockchain.

The registration request received from the first user application can include a biometric commitment. The biometric commitment can be generated by randomizing a biometric ID and applying a hash function to the randomized biometric ID to generate the biometric commitment.

The method according to claim 1, wherein the registration request received from the second user application can include a collectable registration. The collectable registration can include a certificate of authenticity proving that the collectable was inspected by an expert appraiser and is authentic. The certificate of authenticity can be signed with a biometric commitment of the expert appraiser.

An embodiment of the present disclosure provides a non-transitory processor readable medium having stored thereon processor executable instructions for carrying out a method for securing an interblockchain transaction, the interblockchain transaction involving a first transfer on a permissioned blockchain and a second transfer on a permissionless public blockchain. The method includes receiving, from a first user application, a registration request including a first permissioned blockchain public key and a first permissionless blockchain public key. The first permissioned blockchain public key is valid on the permissioned blockchain, and the first permissionless blockchain public key is valid on the permissionless public blockchain. The method further includes receiving, from a second user application, a second registration request including a second permissioned blockchain public key and a second permissionless blockchain public key. The second permissioned blockchain public key is valid on the permissioned blockchain, and the second permissionless blockchain public key is valid on the permissionless public blockchain. The method also includes receiving, from the first user application, a transaction identification. The transaction identification identifies a first transfer transaction executed on the permissionless public blockchain, and the transaction identification identifies the first and second permissionless blockchain public keys. Furthermore, the method includes verifying, using the transaction identification, completion of the first transfer transaction, and in response to verifying the completion of the first transfer transaction, carrying out a second transfer transaction on the permissioned blockchain. The second transfer transaction involving a transfer from the second permissioned blockchain public key to the first permissioned blockchain public key.

An embodiment of the present disclosure provides a system for securing an interblockchain transaction. The interblockchain transaction involves a first transfer on a permissioned blockchain and a second transfer on a permissionless public blockchain. The system includes processing circuitry configured to receive, from a first user application, a registration request including a first permissioned blockchain public key and a first permissionless blockchain public key, the first permissioned blockchain public key being valid on the permissioned blockchain and the first permissionless blockchain public key being valid on the permissionless public blockchain. The processing circuitry is also configured to receive, from a second user application, a second registration request including a second permissioned blockchain public key and a second permissionless blockchain public key, the second permissioned blockchain public key being valid on the permissioned blockchain and the second permissionless blockchain public key being valid on the permissionless public blockchain. Furthermore, the processing circuitry is configured to receive, from the first user application, a transaction identification, the transaction identification identifying a first transfer transaction executed on the permissionless public blockchain, the transaction identification identifying the first and second permissionless blockchain public keys. In addition, the processing circuitry is configured to verify, using the transaction identification, completion of the first transfer transaction, and in response to verifying the completion of the first transfer transaction, carry out a second transfer transaction on the permissioned blockchain. The second transfer transaction involving a transfer from the second permissioned blockchain public key to the first permissioned blockchain public key.

To be able to trade in shares of a collectable (represented, e.g., by tokens), the prospective user obtains a valid identity for use with the system. The prospective user can obtain such an identity by registering via a user application.

FIG. 1 illustrates a user registration process. The registration process begins with the user application creating a commitment (e.g., a randomized hash) for a user's identity data. In the user registration process illustrated in FIG. 1, the user utilizes a biometric solution, e.g. an application executed on a mobile device or distributed between a mobile device and the cloud, to create a biometric ID at 102. The process then creates a commitment at 104. Creating the commitment at 104 can involve, e.g., receiving the biometric ID created at 102, randomizing the biometric ID (e.g. by preprocessing the biometric ID with a random salt value), and then applying a hash function to the randomized biometric ID in order to generate the commitment in the form of a randomized hash of the biometric ID. Subsequently, the user issues a user registration transaction at 106 and a smart contract records the commitment, generated at 104, in the shared ledger provided by the permissioned blockchain 110. The smart contract also generates a user ID from the user's public key (e.g., by hashing the public key and taking the first 10 bytes).

According to certain embodiments, registering and assessing the authenticity of a collectable are mandatory steps to digitize it and store it on the blockchain.

Figure 2:
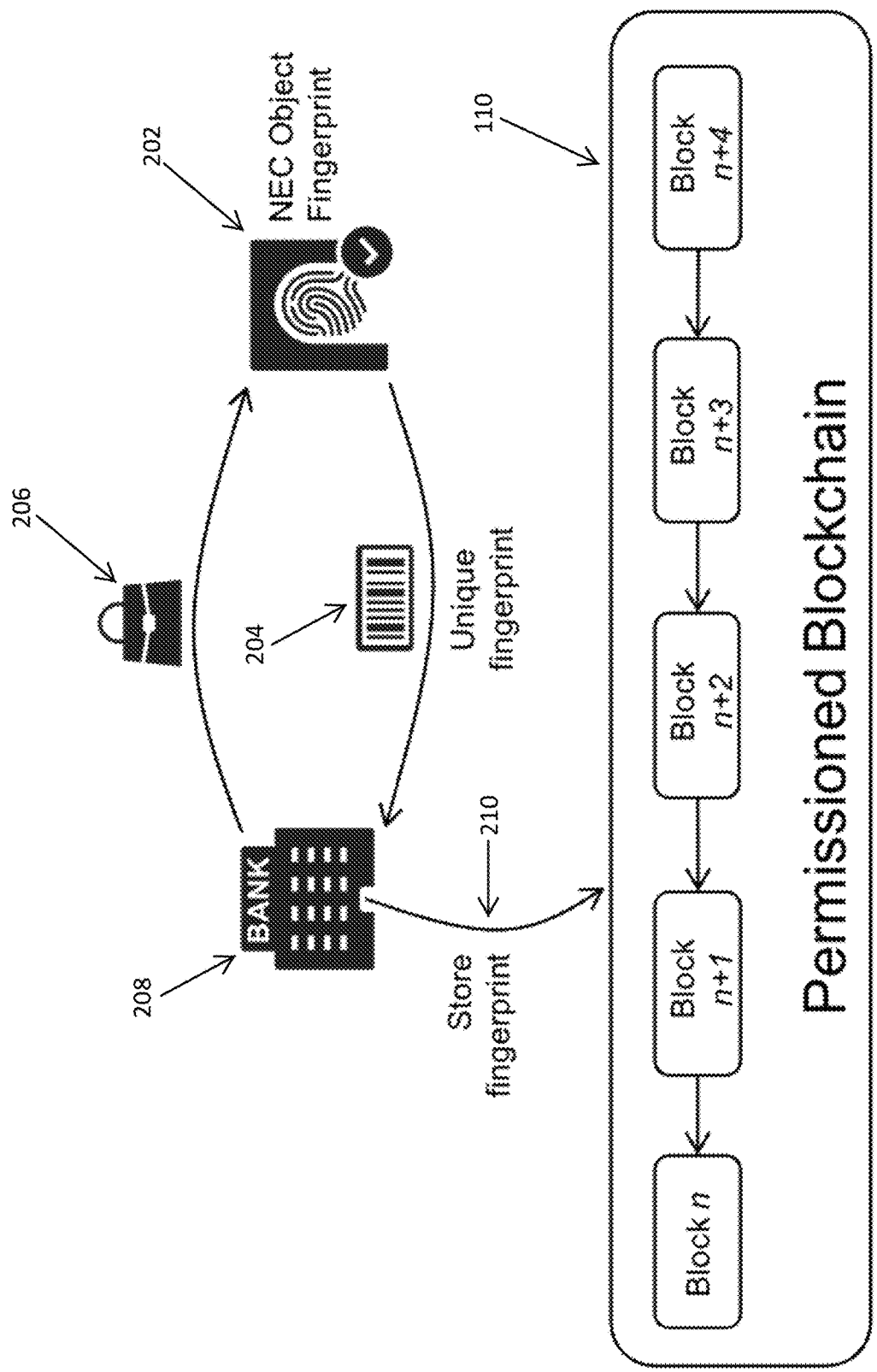
FIG. 2 illustrates a collectable registration process according to an embodiment of the present disclosure.

FIG. 2 illustrates a collectable registration process. In the collectable registration process illustrated in FIG. 2, object fingerprinting software 202 (e.g., NEC object fingerprint software) is utilized to generate a unique fingerprint 204 of the collectable 206. Thereafter, financial institution 208, which has custody of the collectable, initiates a collectable registration transaction at 210 to store the fingerprint on the permissioned blockchain 110. The collectable registration transaction is signed by the financial institution having custody of the collectable. In the collectable registration transaction, the smart contract generates a unique ID that uniquely identifies the collectable in the system, pairs the fingerprint to the ID, and stores both to the permissioned blockchain. Storing the fingerprint on a blockchain ensures a tamperproof fingerprint and therefore ensures that the ownership of the physical collectable is also tamperproof.

According to a certain embodiments, a collectable cannot be traded on the platform until a trusted appraiser certifies its authenticity. Such a step can guard against counterfeiting.

Figure 3:
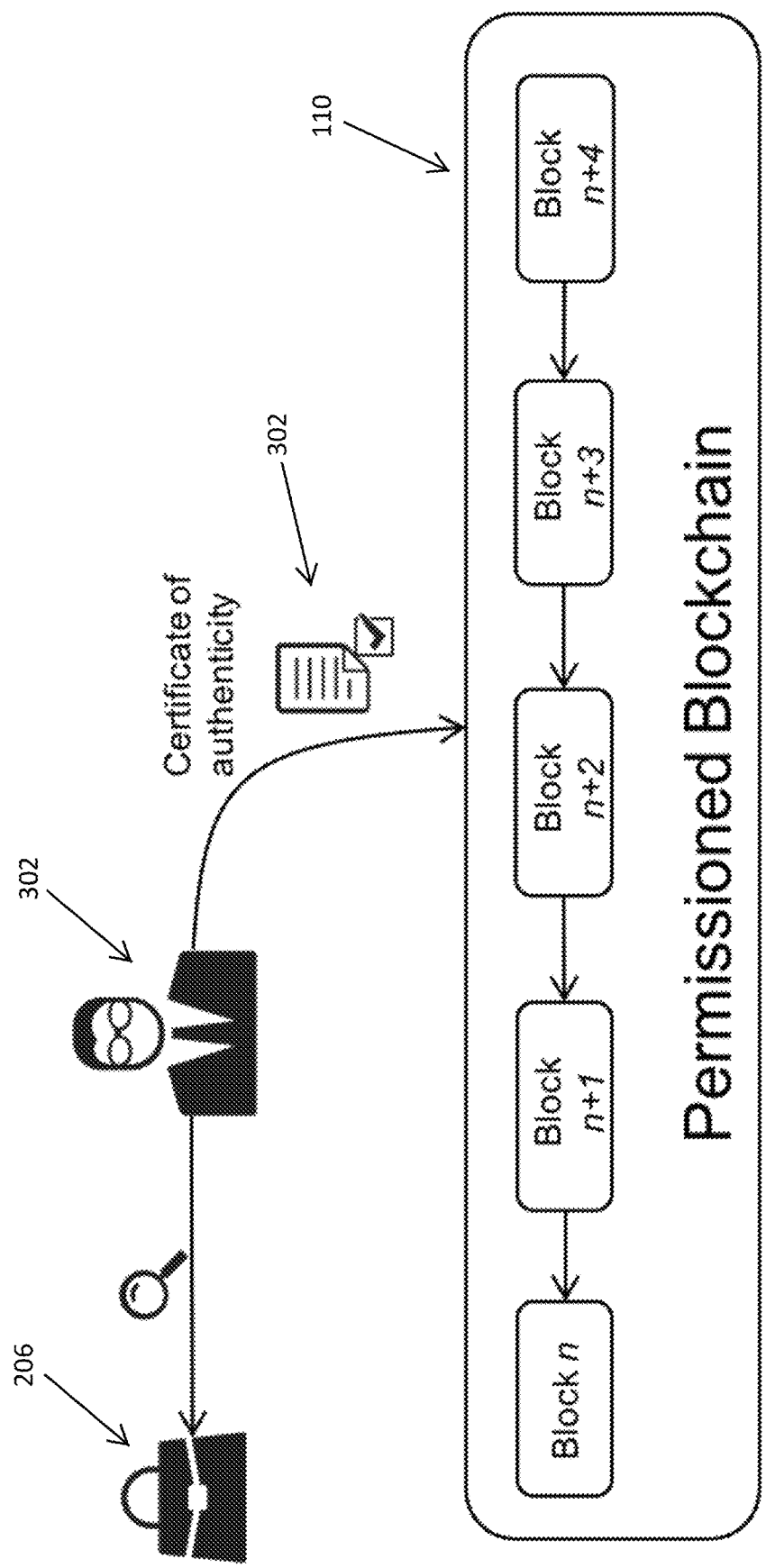
FIG. 3 illustrates a collectable validation process according to an embodiment of the present disclosure.

FIG. 3 illustrates a collectable validation process. The trusted appraiser 302 inspects the collectable 206 to determine its authenticity. If the collectable passes the inspection, the appraiser creates a certificate of authenticity 304 proving that the collectable was inspected by an expert and is authentic. The appraiser than issues and digitally signs a collectable validation transaction at 306 including the certificate to the permissioned blockchain 110. Signing the collectable validation transaction can include signing with a biometric commitment of the appraiser. The smart contract can then add the certificate of authenticity to the collectable's information stored in the permissioned blockchain 110.

Tokenization is the process of converting a collectable into digital tokens. A token is a digital unit of value that can be individually traded in the platform. The total value of the collectable is the sum of the value of its tokens. Tokenization allows for the fractional ownership of collectables, making them affordable to a wider range of users, who will not need to own the whole collectable to profit from its increase in value over time, but rather only a share of the collectable represented by one or more tokens.

Figure 4:
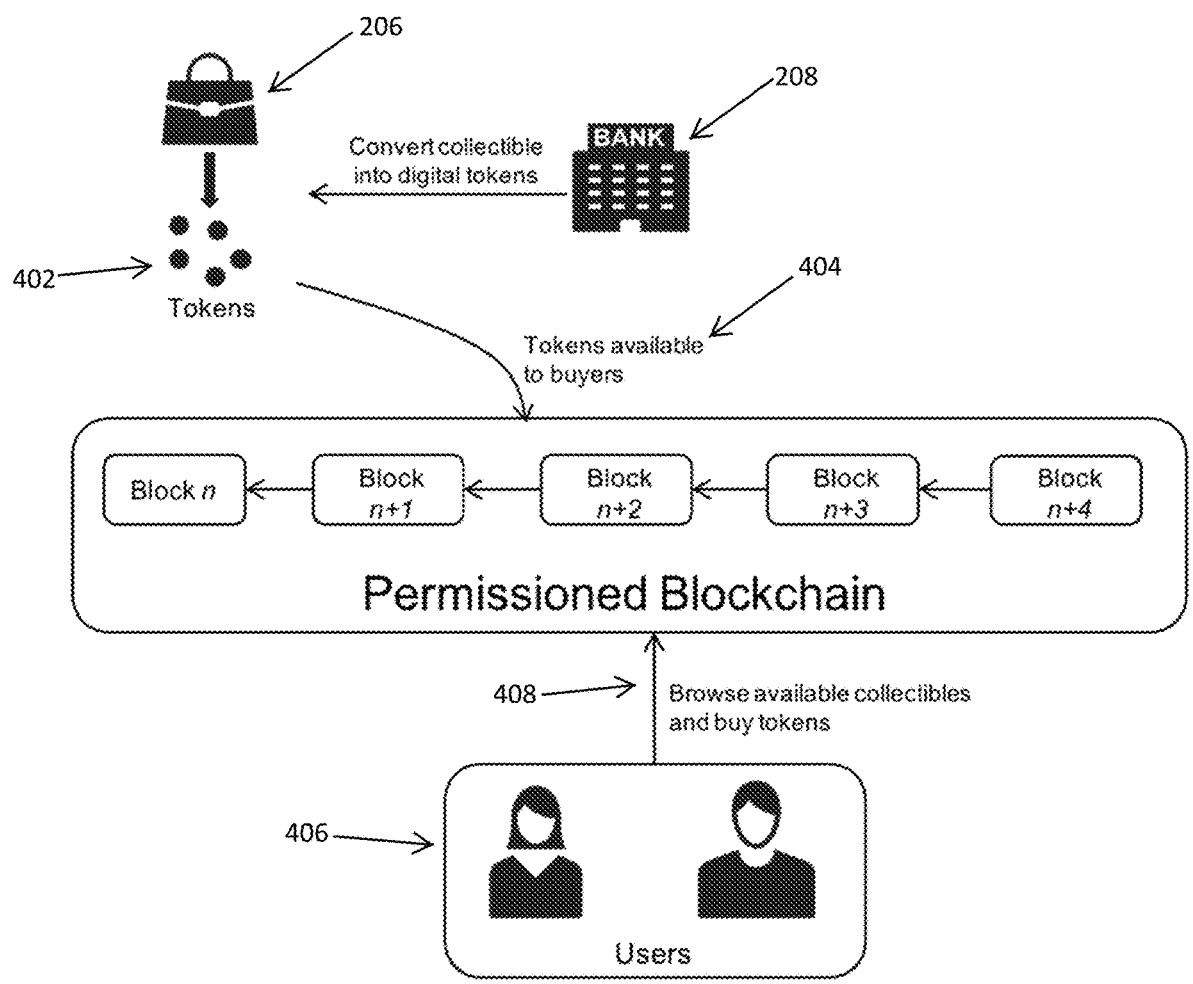
FIG. 4 illustrates a process for the tokenization of a collectable according to an embodiment of the present disclosure.

FIG. 4 illustrates a collectable tokenization process. The financial institution 208 having custody of the collectable 206 assesses its market value and issues a desired number of tokens 402. The tokens 402 can be, e.g., denominated in a cryptocurrencies and equal in value, in the aggregate, to the appraised value of the collectable. The tokens 402 can subsequently be traded on the platform—where users 406 can browse the available collectables and buy tokens at 408. The initial number of tokens and their value can be adjusted based on a supply/demand model, similar to a stock exchange. The financial institution 208 can also issue additional tokens at any point in time (provided it retains some share of ownership in the collectable following the initial issue of tokens), as well as adjust their price. Once a number of tokens and the price of each token are set, the financial institution 208 issues a collectable tokenization transaction at 404 to make the tokens available for trade in the platform. The smart contract can manage the tokens of each collectable, keeping track of their quantity, value, and number of units sold.

Figure 5:
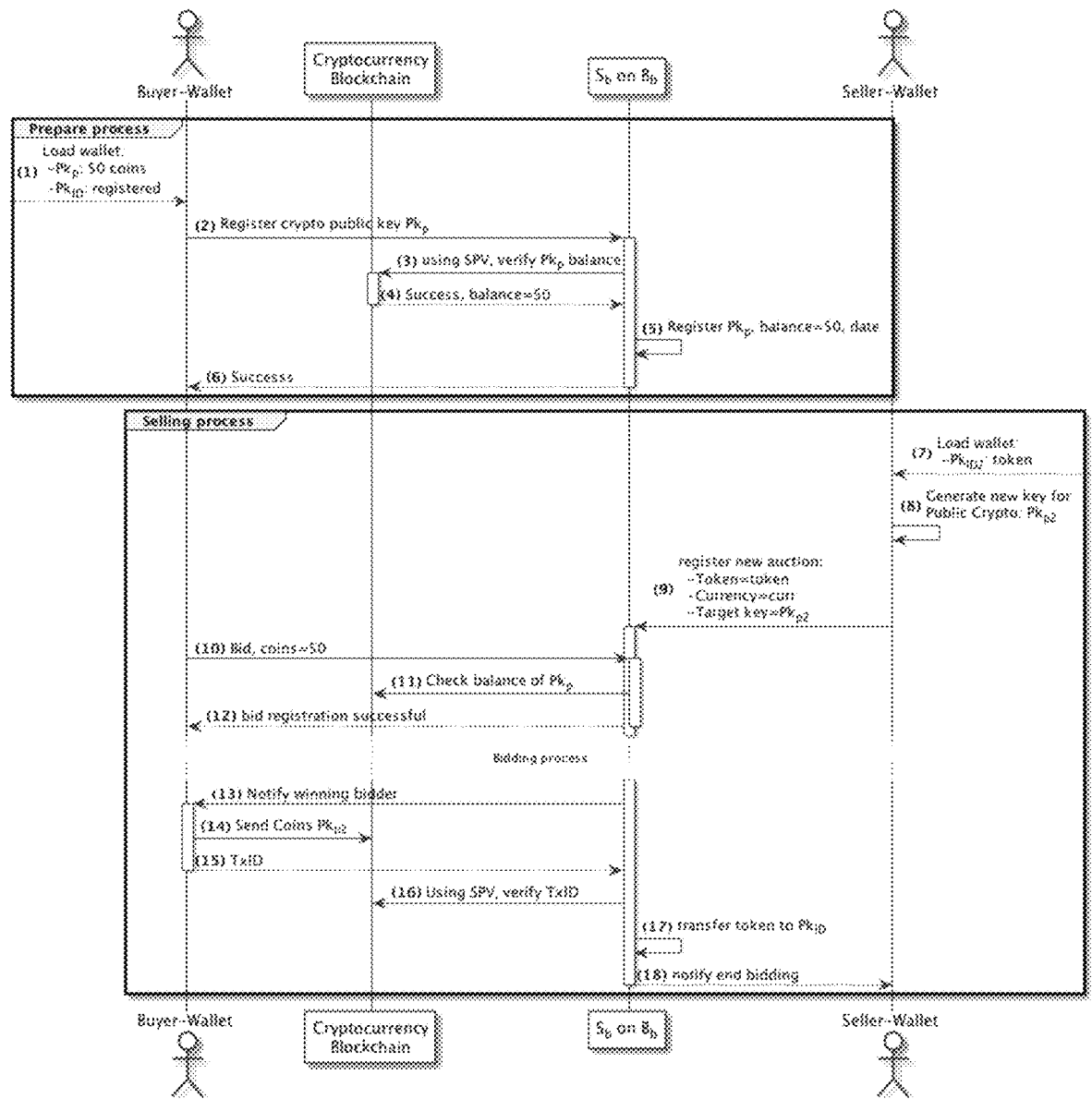
FIG. 5 illustrates a transaction workflow for the exchange, via a private chain, of a share of a collectable represented by a token using cryptocurrencies held on a separate, public chain.

FIG. 5 illustrates a workflow via which the trade of tokens can be carried out via a permissioned blockchain, such as the permissioned blockchain 110. FIG. 5 contemplates a scenario where a seller has a token registered on the private, i.e. permissioned, blockchain, and a buyer has coins of a public cryptocurrency, i.e. a cryptocurrency balance held on a separate, public blockchain, and is interested in buying the token. A setup may be used where the coins are based on a public blockchain, and the tokens are held on a permissioned private blockchain (i.e. a private chain) on which a private smart contract SC handles the token and the exchange. The workflow depicted in FIG. 5 includes the following:

Register Coins:
1. At step (1), the buyer (i.e. the Buyer-Wallet application) loads a wallet with two public keys, one public chain public key, or crypto public key, $Pubkey_{buyer\_coins}$ that holds the coins of the cryptocurrency, and one private chain public key $Pubkey_{buyer}$ that is registered on the private chain.

2. At step (2), the buyer initiates registration of the crypto public key $Pubkey_{buyer\_coins}$ on the private chain in order to prove ownership of a certain amount of the public cryptocurrency. To do so, the buyer issues a register coins transaction.

3.-5. Using the SPV client provided by the public chain on which ownership of the public cryptocurrency is recorded (and on which the crypto public key $Pubkey_{buyer\_coins}$ is valid) the smart contract SC queries the cryptocurrency balance held by the crypto public key $Pubkey_{buyer\_coins}$ on the public chain (step 3) and then successfully receives the balance held (step 4). Upon successful return, the balance and current date are saved on the account of $Pubkey_{buyer}$ to complete the registration of the crypto public key $Pubkey_{buyer\_coins}$ with the private chain.

6. A confirmation of successful registration of the crypto public key $Pubkey_{buyer\_coins}$ with the private chain is returned to the buyer (i.e. the Buyer-Wallet application).

Sell Token:

7. At step (7), the seller (i.e. the Seller-Wallet application) loads a wallet containing a second private chain public key $Pubkey_{seller}$ that holds a token on the private chain.

8. At step (8), the seller generates a new crypto public key $Pubkey_{seller\_coins}$ for the public cryptocurrency that will be used to receive coins resulting from selling tokens held by the seller. The seller can be, e.g., the financial institution 208 of FIGS. 1-4.

9. At step (9), the seller sends a new register auction transaction that identifies the token to sell, the currencies that are accepted, and the address or public key where the purchase funds should be sent. The private blockchain's smart contract SC will "lock" the tokens until the trade is complete 10. At step (10), the interested buyer (i.e. the Buyer-Wallet application) transmits a bid to the private chain's smart contract SC.

11. At step (11), the private chain's smart contract SC verifies the cryptocurrency balance held by the registered crypto public key $Pubkey_{buyer\_coins}$ and, if the balance is greater than or equal to the bid, accepts the transaction.

12. At step (12), the buyer (i.e. the Buyer-Wallet application) is then notified that the bid was accepted. The bidding process potentially continues with multiple buyers, until the end of the auction.

13. At step (13), the smart contract SC then tallies the bids and notifies the winner of the auction (in this case, the buyer, i.e. the Buyer-Wallet application). According to certain embodiments, the operations of steps 9-13 are optional where the seller already knows the buyer.

14. At step (14), the buyer initiates a new transaction (if steps 9-13 did not happen, this will be a direct token transaction) to send the cryptocurrency balance equal to the bid amount and held on the public chain by the crypto public key $Pubkey_{buyer\_coins}$ to the public key $Pubkey_{seller\_coins}$ of the seller on the public blockchain.

15. At step (15), the buyer further sends, to the private chain's smart contract SC, the transaction ID TxID of the transaction via which the cryptocurrency balance equal to the bid amount was sent to the seller.

16-18. Using the SPV client, the smart contract SC verifies the transaction with the ID TxID on the public cryptocurrency blockchain (step 16), and if the result was successful (i.e. the SPV is able to verify that the transaction TxID was properly executed, i.e. added to the public cryptocurrency blockchain), then the smart contract SC transfers the token of the seller to the private chain public key of the buyer $Pubkey_{buyer}$ (step 17) and then notifies the seller that the auction has been completed and that the sale of the token has been successful.

The transaction workflow illustrated in FIG. 5 enables the exchange, via a private chain, of a share of a collectable represented by a token for cryptocurrencies held on a separate, public chain. The transaction workflow illustrated in FIG. 5 thereby enhances the interoperability of multiple blockchains and provides a mechanism by which both the security and the reliability of a transaction—which involves a first exchange on a private chain (i.e. the transfer, from the seller to the buyer, of the token representing the share of the collectable) and a second exchange on a separate, public chain (i.e. the transfer, from the buyer to the seller, of the cryptocurrency balance)—can be assured. Therefore, the transaction workflow provided by the present disclosure enhances both the functionality and the security of blockchain transactions—particularly transactions that are simultaneously executed on multiple different blockchains.

Figure 6:
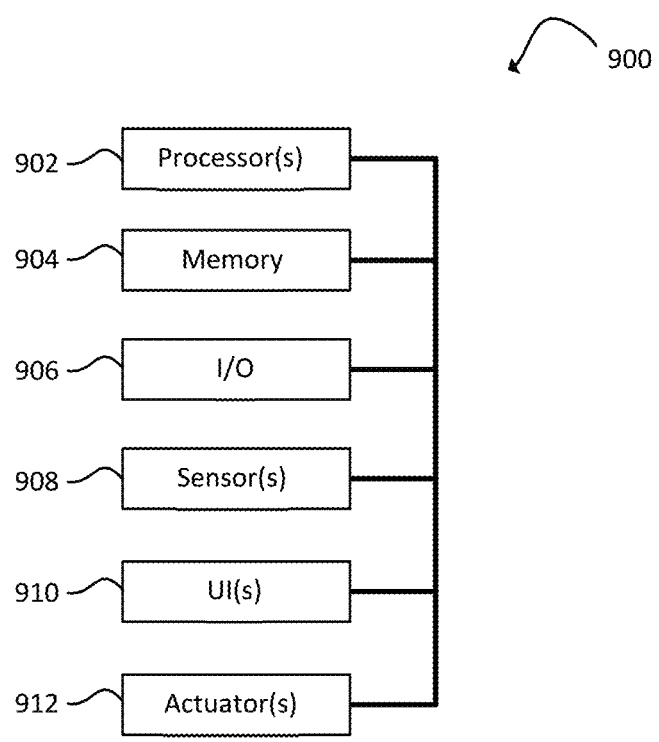
FIG. 6 illustrates a processing system.

Referring to FIG. 6, a processing system 900 can include one or more processors 902, memory 904, one or more input/output devices 906, one or more sensors 908, one or more user interfaces 910, and one or more actuators 912. Processing system 900 can be representative of each computing system disclosed herein.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted to a common substrate or to multiple different substrates.

Processors 902 are configured to perform a certain function, method, or operation (e.g., are configured to provide for performance of a function, method, or operation) at least when one of the one or more of the distinct processors is capable of performing operations embodying the function, method, or operation. Processors 902 can perform operations embodying the function, method, or operation by, for example, executing code (e.g., interpreting scripts) stored on memory 904 and/or trafficking data through one or more ASICs. Processors 902, and thus processing system 900, can be configured to perform, automatically, any and all functions, methods, and operations disclosed herein. Therefore, processing system 900 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 900 can be configured to perform task "X". Processing system 900 is configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure. Memory 904 can include remotely hosted (e.g., cloud) storage.

Examples of memory 904 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 904.

Input-output devices 906 can include any component for trafficking data such as ports, antennas (i.e., transceivers), printed conductive paths, and the like. Input-output devices 906 can enable wired communication via USB®, DisplayPort®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways.

Sensors 908 can capture physical measurements of environment and report the same to processors 902. User interface 910 can include displays, physical buttons, speakers, microphones, keyboards, and the like. Actuators 912 can enable processors 902 to control mechanical forces.

Processing system 900 can be distributed. For example, some components of processing system 900 can reside in a remote hosted network service (e.g., a cloud computing environment) while other components of processing system 900 can reside in a local computing system. Processing system 900 can have a modular design where certain modules include a plurality of the features/functions shown in FIG. 9. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the present disclosure, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for securing an interblockchain transaction involving an exchange of at least partial ownership in a collectable, the interblockchain transaction involving a first transfer on a permissioned blockchain and a second transfer on a permissionless public blockchain, the method comprising:

performing, by a permissioned blockchain processing circuitry:
registering the collectable on the permissioned blockchain, registering the collectable comprising:
receiving a unique digital fingerprint of the collectable,
generating a unique digital ID that uniquely identifies the collectable on the permissioned blockchain, pairing the digital fingerprint with the digital ID, and storing the paired digital fingerprint and digital ID on the permissioned blockchain, and
validating the collectable on the permissioned blockchain, validating the collectable comprising:
receiving a certificate of authenticity digitally signed with a commitment of an appraiser, and
pairing the certificate of authenticity with the digital ID;
tokenizing the validated collectable by generating a plurality of tokens, each token representing a fractional ownership share of the validated collectable; and
securely processing an exchange of one or more of the plurality of tokens for a native cryptocurrency of the permissionless public blockchain, wherein the securing the exchange comprises:
receiving, from a first user application, a registration request including a first permissioned blockchain public key and a first permissionless blockchain public key, the first permissioned blockchain public key being valid on the permissioned blockchain and the first permissionless blockchain public key being valid on the permissionless public blockchain,
receiving, from the first user application, a transaction identification, the transaction identification identifying a transfer of the native cryptocurrency of the permissionless public blockchain executed on the permissionless public blockchain, the transaction identification identifying the first permissionless blockchain public key and a second permissionless blockchain public key,
verifying, using the transaction identification, completion of the transfer of the native cryptocurrency, and
in response to verifying the completion of the transfer of the native cryptocurrency, automatically transferring, from an account associated with a second permissioned blockchain public key that corresponds to the second permissionless blockchain public key, the one or more of the plurality of tokens to an account associated with the first permissioned blockchain public key.

2. The method according to claim 1, wherein the securing the exchange further comprises, in response to the receiving the registration request from the first user application, verifying a balance of the native cryptocurrency held by an account associated with the first permissionless blockchain public key on the permissionless public blockchain.

3. The method according to claim 2, wherein the verifying the balance of the native cryptocurrency held by the account associated with the first permissionless blockchain public key on the permissionless public blockchain comprises invoking, by the permissioned blockchain processing circuitry, a simplified payment verification (SPV) client provided by the permissionless public blockchain to verify the balance.

4. The method according to claim 3, wherein the verifying the completion of the transfer of the native cryptocurrency comprises invoking, by the permissioned blockchain processing circuitry, the SPV client to retrieve a proof that the transaction identification is included in one of a series of block headers from the permissionless public blockchain.

5. The method according to claim 1, wherein the commitment of the appraiser is a biometric commitment.

6. The method according to claim 5, wherein the biometric commitment is generated by randomizing a biometric ID of the appraiser and applying a hash function to the randomized biometric ID of the appraiser to generate the biometric commitment.

7. A non-transitory processor readable medium having stored thereon processor executable instructions for carrying out a method for securing an interblockchain transaction involving an exchange of at least partial ownership in a collectable, the interblockchain transaction involving a first transfer on a permissioned blockchain and a second transfer on a permissionless public blockchain, the method comprising:
  registering the collectable on the permissioned blockchain, registering the collectable comprising:
    receiving a unique digital fingerprint of the collectable, and
    generating a unique digital ID that uniquely identifies the collectable on the permissioned blockchain, pairing the digital fingerprint with the digital ID, and storing the paired digital fingerprint and digital ID on the permissioned blockchain;
  validating the collectable on the permissioned blockchain, validating the collectable comprising:
    receiving a certificate of authenticity digitally signed with a commitment of an appraiser, and
    pairing the certificate of authenticity with the digital ID;
  tokenizing the validated collectable by generating a plurality of tokens, each token representing a fractional ownership share of the validated collectable; and
  securely processing an exchange of one or more of the plurality of tokens for a native cryptocurrency of the permissionless public blockchain, wherein the securing the exchange comprises:
    receiving, from a first user application, a registration request including a first permissioned blockchain public key and a first permissionless blockchain public key, the first permissioned blockchain public key being valid on the permissioned blockchain and the first permissionless blockchain public key being valid on the permissionless public blockchain,
    receiving, from the first user application, a transaction identification, the transaction identification identifying a transfer of the native cryptocurrency of the permissionless public blockchain executed on the permissionless public blockchain, the transaction identification identifying the first permissionless blockchain public key and a second permissionless blockchain public key,
    verifying, using the transaction identification, completion of the transfer of the native cryptocurrency, and
    in response to verifying the completion of the transfer of the native cryptocurrency, automatically transferring, from an account associated with a second permissioned blockchain public key that corresponds to the second permissionless blockchain public key, the one or more of the plurality of tokens to an account associated with the first permissioned blockchain public key.

8. A system for securing an interblockchain transaction involving an exchange of at least partial ownership in a collectable, the interblockchain transaction involving a first transfer on a permissioned blockchain and a second transfer on a permissionless public blockchain, the system comprising:
  processor circuitry configured to:
    register the collectable on the permissioned blockchain by:
      receiving a unique digital fingerprint of the collectable, and
      generating a unique digital ID that uniquely identifies the collectable on the permissioned blockchain, pairing the digital fingerprint with the digital ID, and storing the paired digital fingerprint and digital ID on the permissioned blockchain;
    validate the collectable on the permissioned blockchain by:
      receiving a certificate of authenticity digitally signed with a commitment of an appraiser, and
      pairing the certificate of authenticity with the digital ID;
    tokenize the validated collectable by generating a plurality of tokens, each token representing a fractional ownership share of the validated collectable; and
    securely process an exchange, of one or more of the plurality of tokens for a native cryptocurrency of the permissionless public blockchain, by:
      receiving, from a first user application, a registration request including a first permissioned blockchain public key and a first permissionless blockchain public key, the first permissioned blockchain public key being valid on the permissioned blockchain and the first permissionless blockchain public key being valid on the permissionless public blockchain,
      receiving, from the first user application, a transaction identification, the transaction identification identifying a transfer of the native cryptocurrency of the permissionless public blockchain executed on the permissionless public blockchain, the transaction identification identifying the first permissionless blockchain public key and a second permissionless blockchain public key,
      verifying, using the transaction identification, completion of the transfer of the native cryptocurrency transaction, and
      in response to verifying the completion of the transfer of the native cryptocurrency, automatically transferring, from an account associated with a second permissioned blockchain public key that corresponds to the second permissionless blockchain public key, the one or more of the plurality of tokens to an account associated with the first permissioned blockchain public key.

* * * * *